March 23, 1937. R. S. BOHANNAN 2,074,718
DIFFERENTIAL FLUID PRESSURE CONTROL SYSTEM
Filed May 8, 1935 3 Sheets-Sheet 1
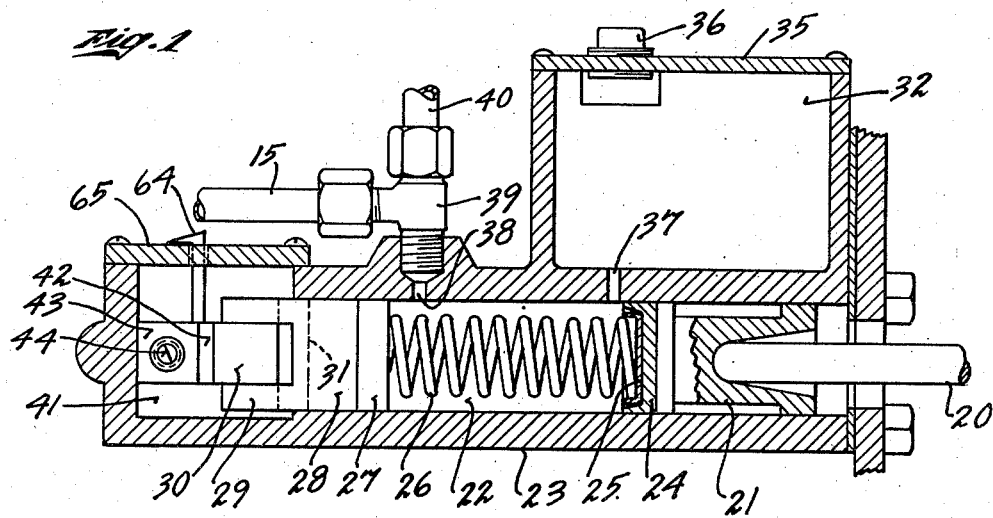
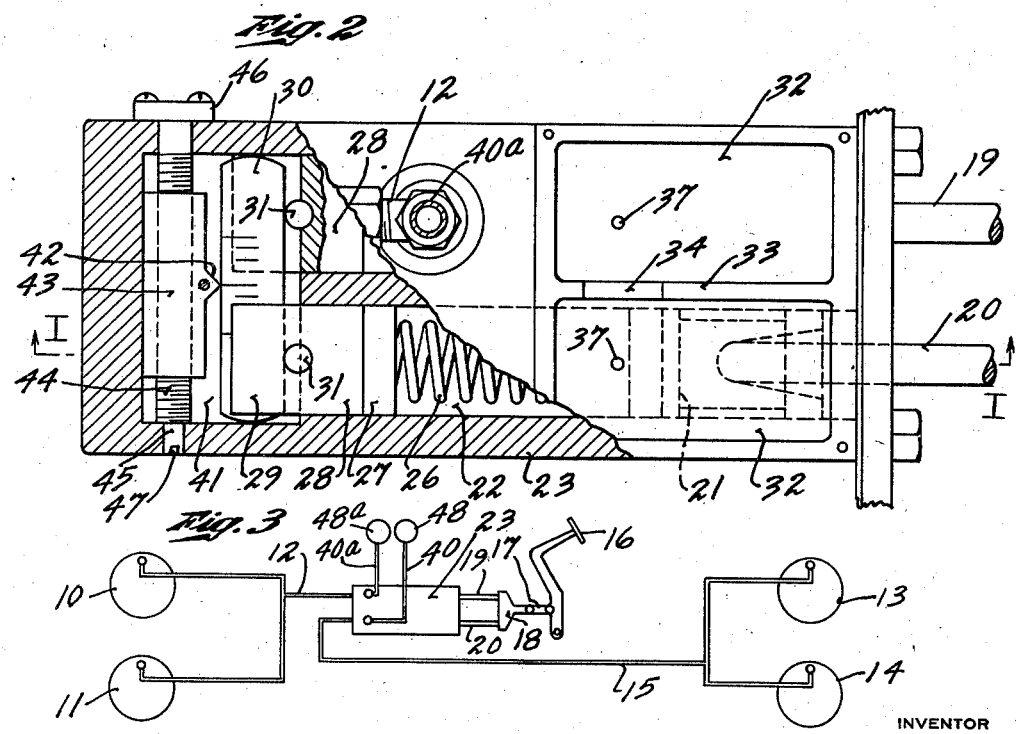
INVENTOR
R. S. Bohannan
BY
ATTORNEYS

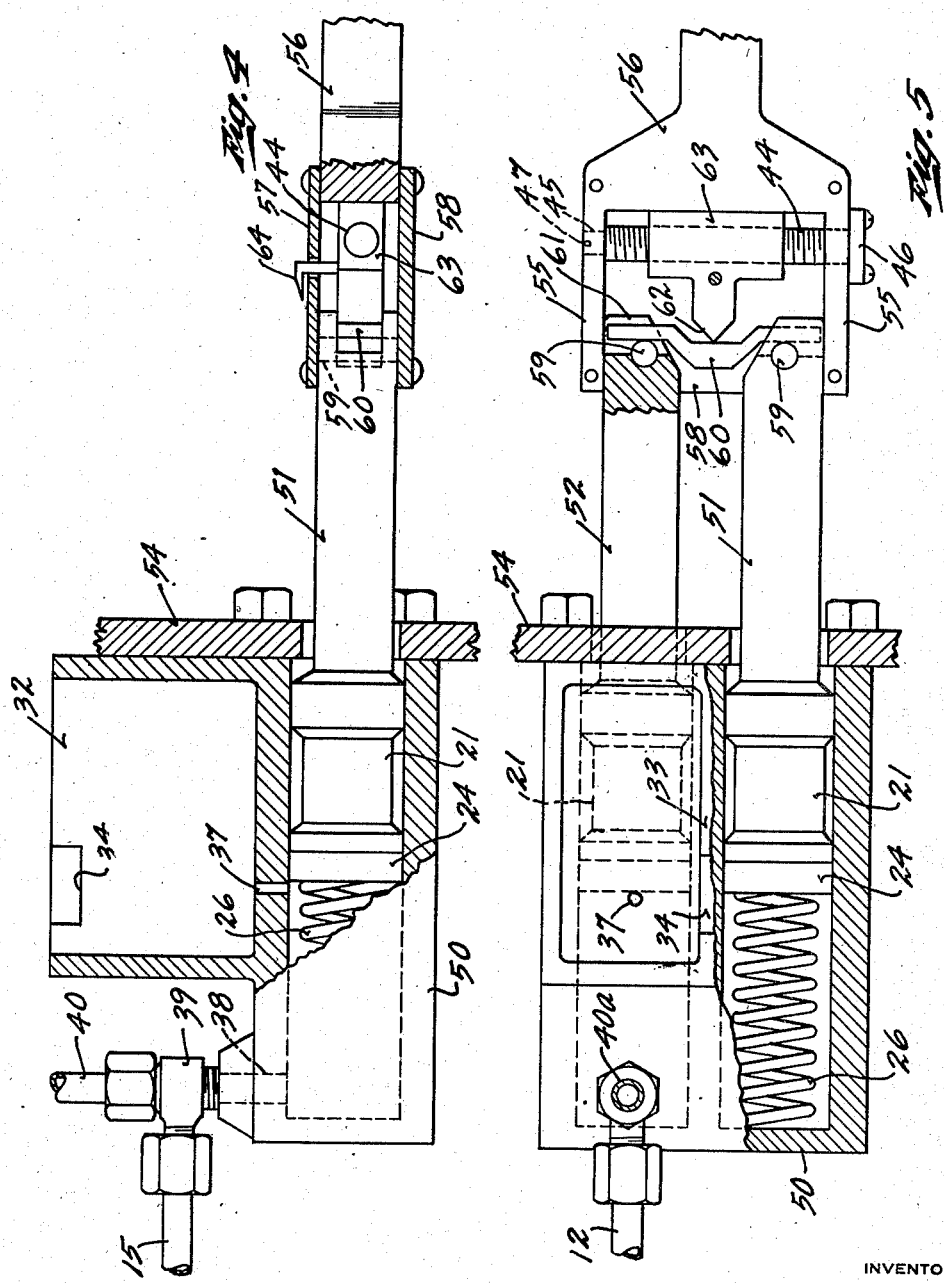

March 23, 1937. R. S. BOHANNAN 2,074,718
DIFFERENTIAL FLUID PRESSURE CONTROL SYSTEM
Filed May 8, 1935 3 Sheets-Sheet 3
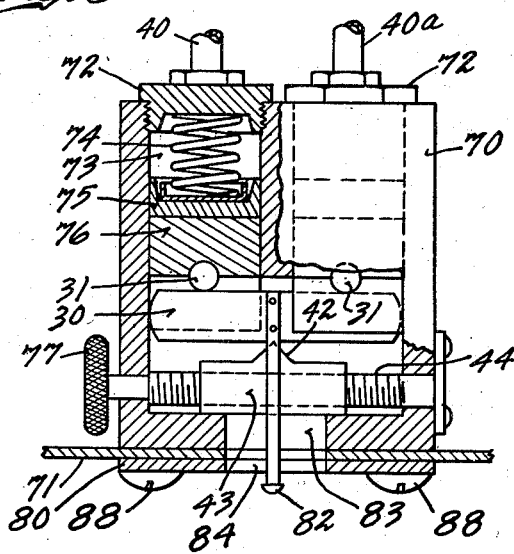
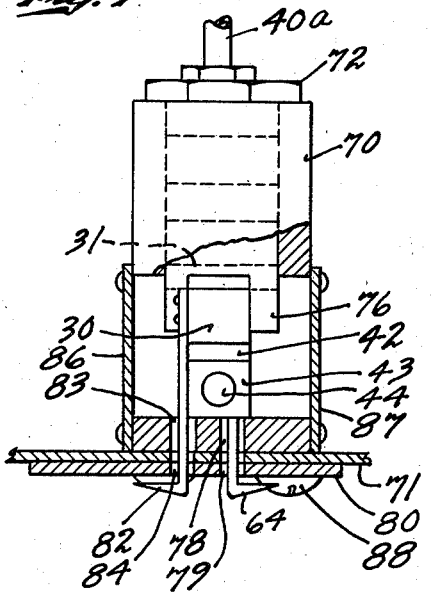
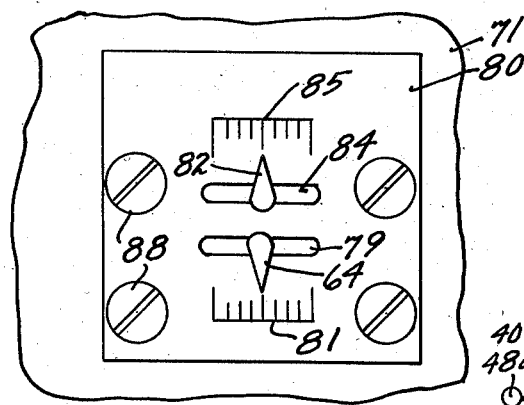
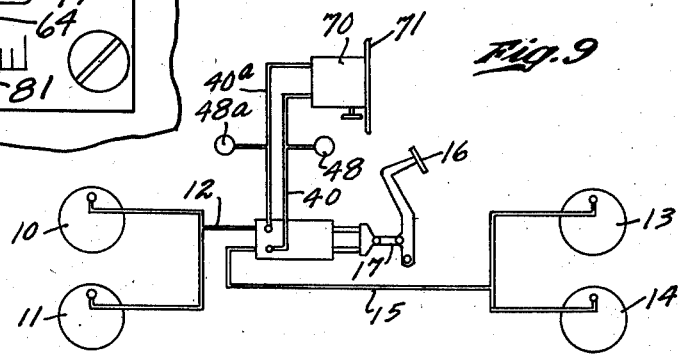
INVENTOR
R. S. Bohannan
BY
ATTORNEYS Patented Mar. 23, 1937

2,074,718

UNITED STATES PATENT OFFICE 2,074,718

DIFFERENTIAL FLUID PRESSURE CONTROL SYSTEM

Robert S. Bohannan, Birmingham, Ala.

Application May 8, 1935, Serial No. 20,338

13 Claims. (Cl. 188—152)

My invention relates to apparatus for the control of fluid pressure in various uses such, for instance, as to apply with variable and differential pressure the front and rear brakes of automobiles.

Using such an embodiment of my invention as illustrative of the principles involved, it may be said that fluid pressure has been successfully used to apply braking pressure on automobiles and in such use it has for sometime been common practice to employ a double cylinder with its pistons jointly operated by a brake pedal and each controlling the pressure in its respective piping system leading either to the front or rear wheel brakes.

In the practical use of such brake applying mechanism, it has been found highly desirable that different pressures be utilized on the front and rear brakes and that the control mechanism for applying the different pressures should be capable of ready adjustment to make the desired division of the total braking pressure developed by the pedal. Such an arrangement contemplates, for instance, that the front brakes may receive 40% of the total developed pressure and the rear brakes 60%. It is important, and in fact essential for the best results, that this percentage should remain a constant throughout the full range of the braking pressure developed by the pedal, and to obtain such a result is the main object of this invention.

More particularly, my invention contemplates providing a balancing control bar and a fulcrum therefor, which are capable of relative adjustment so as to unbalance the bar to the desired side and extent, the bar being adapted to control the position of pistons, plungers or controllers that are exposed to the pressure of the several control lines and thereby to maintain the relations of the pressure in such lines. As such bar rocks upon its fulcrum responsive to being unbalanced, it produces a differential movement of the pistons or plungers which it controls and causes their relative displacement with a resultant change in the pressure in the pressure lines which they respectively control. This change will be exerted in a manner to maintain constant the relative percentages of the applied pressure.

A further feature of my invention consists in so designing the control bar and its fulcrum that its balancing point lies in the same plane with the points of contact between the bar and the elements it controls.

My invention contemplates the interposition of the variable leverage control either between the transmission from the pedal to the pressure generating pistons or between such pistons and the points of use by means of control plungers exposed to the pressure in the different pressure lines at any convenient points therein, the latter arrangement making it possible to place the control wherever desired as on the dash of the automobile.

My invention further contemplates mounting the fulcrum for adjustment under screw control relative to a gauge or scale on the control bar, thereby permitting of an accurate setting of the fulcrum according to the extent and direction of the unbalancing of the lever desired.

My invention further, where the dash control is used, contemplates applying to both the control bar and to its adjustable fulcrum, indicators which operate over exposed scales to indicate the position of the fulcrum and the inclination of the control bar.

My invention further comprises the novel details of construction and arrangements of parts which in their preferred embodiments only are illustrated in the accompanying drawings and pointed out in the specification and claims, it being understood, however, that the particular manner of applying power to the pressure generating pistons and the particular agencies selected to produce and control the fluid pressure, can be widely varied and applied to other uses than that shown.

As illustrated in the drawings:—

Fig. 1 is a cross-sectional view in which the housing is broken away along the line I—I of Fig. 2.

Fig. 2 is a plan view of Fig. 1 with the cover removed from the fluid chambers, the top housing wall broken away to show the balancing bar and its fulcrum mechanism in plan, and one piston broken away to more fully expose its line contact with one side of the bar.

Fig. 3 is a diagrammatic layout showing one application of my fluid pressure control to two independent groups of power units.

Fig. 4 is a side view broken away to show in side elevation the control mechanism comprising the differential balancing bar and its adjustable fulcrum elements interposed in the transmission between the pedal and the fluid pressure generating pistons.

Fig. 5 is a plan view of Fig. 4 with the housing and transmission broken away to show one of the pressure generating pistons and the differential actuating mechanism in plan.

Fig. 6 is a modification of my invention showing the variable leverage mechanism acting on auxiliary plungers which by relative movement determine the pressure difference in the fluid control lines, the housing of the control mechanism being broken away and one plunger mechanism being shown in cross-section.

Fig. 7 is a side view of Fig. 6 with the housing broken away to show the variable leverage mechanism and part of the near control plunger in side elevation.

Fig. 8 is a fragmental front view of an indicator panel showing the control mechanism of Fig. 6 in front elevation.

Fig. 9 is a diagrammatic layout showing the control of Figs. 6 to 8 applied to the front and rear brake systems of an automobile with the brake pressure controller and indicator mounted on the dash.

Similar reference numerals refer to similar parts throughout the drawings.

In the embodiment of my invention illustrated in Figs. 1 to 3, I show my improved fluid pressure control mechanism operating the units 10 and 11 for applying the front brakes by means of the pressure line 12, and operating similar units 13 and 14 for applying the rear brakes by means of the pressure line 15, pressure being generated in these lines by the actuation of the pedal 16. It is to be understood, however, that the brakes are typical of any other mechanisms adapted to be operated responsive to fluid pressure control, and that the units 10, 11, 13 and 14 may take the form of any suitable fluid pressure motor.

I have selected as an illustrative means for generating fluid pressure, the pedal 16 which by means of a link 17 transmits pressure to the cross head 18 to which the piston rods 19 and 20 for the pistons 21 are connected. These pistons work in separate cylinders 22 in a common housing 23, and the arrangement of parts in each cylinder being the same, the description of one will apply to both. Each piston 21 has a tapering recess on its outer end to receive its respective piston rod 19 or 20; is circumferentially grooved to provide an oil seal; and at its inner end carries a cup washer 24 and a spring cup seat 25. A coil spring 26 engages said seat 25 and a similar seat seated in association with a cup washer 27 on a control plunger 28 working in continuation of the same cylinder. The outer end of the plunger 28 is yoked at 29 and adapted to straddle at its respective end a balancing control bar 30, the plunger carrying a vertical cross pin 31 in its center to provide a line bearing against the balancing bar.

In the upper portion of the housing above each cylinder I provide a separate fluid supply chamber 32, which chambers are separated by a partition 33 having a top equalizing port 34 and are covered overhead by a plate 35 having a filling plug 36. From each fluid chamber 32 a port 37 leads into the underlying cylinder between the cup washers 24 and 27 and is adapted to be closed by the piston when actuated. A pressure outlet port 38 also leads from between said cup washers in position not to be closed by the piston movement and by means of a fitting 39 it delivers fluid pressure to its respective gauge line 40 or 40a and control line 15 or 12.

The balancing bar is mounted in a control chamber 41 free to rock about a vertical axis responsive to the application of pressure to its ends from the two plungers 28 that control it. The balancing bar rocks upon a transversely adjustable fulcrum 42 on a block 43 slidably seated against the rear wall of the housing and having an axial threaded bore to receive a control screw 44. This screw is mounted to rotate freely in opposite walls of the chamber 41, being reduced at one end 45 and at the other end engaged by a plate 46 bolted to the other side of the housing and demountable to permit the insertion and removal of the screw.

The end 45 carries a tool slot 47 by means of which a screw driver can be used to turn the screw and adjust the fulcrum transversely to change the axis of the balancing control bar. As noted, this bar carries a graduated scale by means of which the extent of the displacement of its fulcrum on either side of its center line is indicated. Each of the pipe lines 40 and 40a lead to pressure gauges 48 and 48a disposed in any convenient position.

Asuming the elements assembled as described and the chambers 32 filled with a suitable fluid, upon the application of pressure to the pedal 16, both pistons 21 will be forced inwardly with equal pressure, and the fluid will be trapped by the blanking off of the ports 37 between the cup pistons 24 and 27 and the control plungers 28 will be subjected also to the full developed pressure which they in turn transmit to opposite ends of the balancing bar 30.

Now if the fulcrum point be at the center of the balancing bar, the leverage thereon will be balanced, the bar will not rock about its fulcrum, and an equal pressure will be delivered through ports 38 via both pressure lines 12 and 15 to the several points of use in the manner that will be well understood in this art. If, however, the fulcrum point 42 be shifted out of central or balanced position with reference to the control bar 30, then, when pressure is applied against the control plungers 28, the pressure applied on the longer leverage side will overcome the equal pressure applied on the shorter leverage side of the bar, causing the bar to rock and allowing a relative displacement of the two plungers 28. This relative displacement will result in a reduced pressure on the side having the greater plunger displacement and an increased pressure on the side having the lesser plunger displacement. In other words, the short end of the control bar will maintain the higher pressure and the long end the lower pressure, in the pressure lines that they respectively control. The interesting thing about this arrangement is that, regardless of the amount of power applied from the pedal or other source of power, the percentage of the applied power that is effective in the two distribution lines will be a constant percentage throughout the full range of generated pressure, and by adjusting the position of the fulcrum the relative percentages allotted to the control lines can be varied according to their respective needs.

In the embodiment of my invention shown in Figs. 4 and 5, the elements 21, 24, 25, 26 and 32 to 41, are as described in connection with Figs. 1 and 2. The springs 26 in this design bear against the rear ends of the cylinders in the modified housing 50. Each piston 21 is rigidly connected to its piston rod 51 or 52 which passes freely through the end wall 54 of its cylinder and is loosely fitted between the yoke arms 55 of a pedal connector 56. The yoke carries top and bottom plates 57 and 58 bolted thereto and the piston rods each carry an end bearing pin 59, which pins engage the ends of the control bar 60 having ends received in bifurcations 61 formed at the outer ends of the piston rods. The balancing bar has its face engaging the fulcrum 62 countersunk so as to lie substantially in the same plane with its points of engagement with the pins 59. The fulcrum point is carried on the slide block 63 which bears against the inner end of the yoke and is controlled by a screw 44 having the parts 45, 46 and 47 as already described which are mounted in the sides of the yoke 55 in a manner to permit the fulcrum point to be shifted throughout the requisite range of adjustment. The fulcrum blocks 43 and 63 each carry an indicator pin 64, which, as shown in Fig. 1, extends through a cover plate 65 above the equalizer chamber 41, and as shown in Fig. 4 projects through the top cover plate 57. In each case, if desired, the pointer will be associated with a scale to indicate the relative displacement of the fulcrum point with reference to its central or pressure equalizing position.

If it be desired to set the pressure for applying the front brakes at 40% and the rear brakes at 60% of the pedal generated pressure, then a screw driver is applied to screw 44 at 47 and the screw turned in a direction to draw the fulcrum block 43 toward the operator, thereby setting the fulcrum point off center and leaving the longer end of the bar 30 opposite the plunger that controls the pressure in line 12. Then an equal given pressure being on the plungers 28, the one bearing on the long end of the bar will overbalance the one bearing on the short end, causing relative movement of the plungers and thereby decreasing the pressure in the line 12 controlled by the outgoing plunger and increasing the pressure in the line 15 controlled by the incoming plunger. Thus, a differential pressure is established in the lines 12 and 15 which differential is responsive to difference in leverage caused by the shifting of the fulcrum point off center, and this difference is such that throughout the range of variation in the pressure generated by the pistons 21, the percentage of the generated pressure available for the front brakes will be 40% and for the rear brakes 60%. By shifting the fulcrum point more or less this relative percentage can be varied and by shifting the fulcrum point past center in the other direction the pressure differential is reversed in the lines 12 and 15. For each operating position of the fulcrum the pressure differential remains a constant throughout the full stroke of the brake pedal and the resultant range of brake applying pressure.

The operation of the arrangement shown in Figs. 4 and 5 is the same as that above described, it being desirable to bring the point of engagement between the balancing bar and its control elements 59 and 62 substantially into a common plane, if very accurate control of the pressure differential is desired. The pins 59 have a sliding engagement with the balancing bar which permits it to rock without putting a lateral strain on the pistons.

The springs 26, Fig. 5, will cause the pistons to move together until they cut off the ports 37 simultaneously. As the pistons start their advance they displace fluid into the chambers 32 until ports 37 are blanked. After this, the development of pressure begins subject to the control above described. On the back stroke, the springs push the pistons out the same distance, open ports 37 and allow fluid to fill the cylinder and replace any line loss.

In Figs. 6 to 8 I show a further embodiment of my invention in which the auxiliary control pistons shown in the master cylinders in Fig. 2, are transferred to a housing 70 which, if desired, may be mounted upon the dash 71, with the leads 40 and 40a extending past the gauge connections and each entering its respective control cylinder in the housing 70 through a reducer plug 72 screwed into the outer end of each end of each cylinder 73. A spring 74 is interposed between each plug 72 and a cup washer 75 carried by an auxiliary plunger 76 which by means of the pin 31 engages the balancing bar 30 which coacts with its fulcrum 42 on the slide block 43 that is adjustable under control of the screw 44 in the manner already described. The screw 44 in this arrangement is controlled by a knurled wheel 77 and the block 43 carries on its side engaging the end wall of the housing an indicator pointer 64 which extends through a suitable slot 78 in the end wall of the housing and through the dash 71 and through a slot 79 in the indicator plate 80. This pointer coacts with a scale or gauge 81 on the plate 80.

The balancing bar has an indicator 82 extending through aligning slots 83 in the housing and 84 in the plate 80 and its pointer coacts with a scale 85 to indicate the angular displacement of the equalizing bar 30 while the position of the pointer 64 indicates the off-center position of the fulcrum.

The equalizer chamber in the housing being closed above and below by plates 86 and 87 which are suitably bolted to the housing, and the indicator plate 80 is held in place by screws 88 which mount the housing 70 on the dash panel.

In the operation of this embodiment of my invention, when pressure is applied by the pedal 16, the resulting pressure has access through the lines 40 and 40a to the auxiliary plungers 76 in the housing 70 and is thereby transmitted through pins 31 to the balancing bar 30, which is permitted to rock on its fulcrum when the fulcrum is out of central position and thus establish a differential pressure as above described in the pressure lines 12 and 15.

The plug 34 permits both chambers to be filled through one port. Should either line break, only its respective fluid supply chamber 32 will be drained, the other chamber 32 and the fluid pressure system it supplies being unaffected by such break.

The car driver can, by manipulating the screw 77, apply the desired percentage of pressure on the front brakes, making this pressure as much lighter than that on the back brakes as conditions call for, and whatever percentage of pressure the mechanism is set to deliver to the front brakes that percentage will be maintained constant throughout the full range of pressure applied at the pedal. My invention, therefore, will maintain a constant proportion of braking effort between the front and the rear brakes during the entire stroke of the pedal and the percentages of pressure applied to the front and rear brakes respectively will not change due to the pedal movement or the increase in pedal pressure.

My invention is obviously not limited in its application to the number of elements 10 to 14 controlled by the lines 12 or 15, it being understood that these elements conventionally illustrate any agency or mechanism upon which the control pressure is to exert its effect. In like manner the pedal is typical of any source of variable power to create the pressure in the control system.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a fluid pressure control means, two fluid pressure generators, a separate distribution line for each generator, and means to maintain automatically a predetermined difference in pressure in said lines comprising a pressure generator and a pressure controller responsive to the pressure in each line, and a variable leverage means adapted to effect relative differential movement of said controllers.

2. In a fluid pressure control system, cylinders, pistons for said cylinders, means to actuate the pistons to generate fluid pressure, a separate distribution system supplied by each cylinder, and a variable leverage controller means comprising pressure regulating pistons operable on both pressure systems and automatically responsive to variations in the pressure generated to establish in each system a predetermined percentage of such pressure.

3. In combination separate systems for the fluid pressure control of brakes, means to generate a variable pressure in said systems, and controller means to maintain in each system a predetermined percentage of the generated pressure unaffected by variations thereof, said controller means comprising a balancing bar, a movable fulcrum therefor, and a fluid pressure operated pressure control element for each system relatively and differentially movable under the control of said bar.

4. Means for controlling the distribution of the available braking effort to front and rear wheel brakes, comprising a fluid pressure operating system for each set of brakes, a common control means actuated by the fluid pressure in both systems and acting on the fluid pressure in each system to make a fixed percentage of available braking effort effective for each set of brakes, and means to vary the fixed percentages.

5. Means for controlling the distribution of the available braking effort to front and rear wheel brakes, comprising a fluid pressure operating system for each set of brakes having a pedal actuated plunger in each system to generate the brake operating fluid pressure, and a common control means acting on the fluid pressure generated in each system to make a fixed percentage of available braking effort effective for each set of brakes and comprising a lever of the first order, a pressure controller piston for each system one of which bears on each end of said lever, and a shiftable fulcrum for said lever to vary the leverage and effect relative opposed movement of said controllers.

6. Means for controlling the distribution of the available braking effort to front and rear brakes, comprising separate fluid pressure distribution systems for the front and rear brakes, pedal control means tending to generate an equal pressure in both systems, a controller exposed to the fluid pressure for each set of brakes, a balancing bar having its ends operable by said controllers, and a movable fulcrum for said bar adapted to be set to vary the relative leverage effect of said controllers on said bar and to produce thereby a differential movement of said controllers.

7. A controller means according to claim 6, in which the points of contact between the bar on the one hand and said controllers and fulcrum on the other lie substantially in a common plane.

8. A controller means according to claim 6, in which the fulcrum carries an indicator means to show its off-center relationship to the bar.

9. A controller means according to claim 6, in which the bar has an indicator means to show changes in the angular position of the bar responsive to variations in the available braking effort.

10. A control means according to claim 6, in which the pressure generator and controller for each system comprise opposed pistons in combination with coiled springs interposed between each pair of opposed pistons to restore parts to initial position upon release of braking pressure.

11. A control means according to claim 6, in combination with screw means to adjust and lock the fulcrum in set operating position.

12. Means for controlling the distribution of the available braking effort to front and rear brakes, comprising a pair of pedal operated pistons, a cylinder for each piston with means to supply fluid thereto and distribute fluid pressure therefrom to front or rear brakes, a controller exposed to the fluid pressure for each set of brakes, a balancing bar having its ends operable by said controllers, and a movable fulcrum for said bar adapted to be set to vary the relative leverage effect of said controllers on said bar, the balancing bar and its shiftable fulcrum being interposed in the transmission between said pedal and pistons.

13. Means for controlling the distribution of the available braking effort to front and rear brakes, comprising a pair of pedal operated pistons, a cylinder for each piston with means to supply fluid thereto and distribute fluid pressure therefrom to front or rear brakes, a controller exposed to the fluid pressure for each set of brakes, a balancing bar having its ends operable by said controllers, and a movable fulcrum for said bar adapted to be set to vary the relative leverage effect of said controllers on said bar, the controller elements being plungers responsive to the fluid pressure between the pistons and the brakes.

ROBERT S. BOHANNAN.